Feb. 16, 1926.
J. STEINER
METHOD OF PRODUCING BAGS OR THE LIKE
Filed Nov. 7, 1925
1,573,201
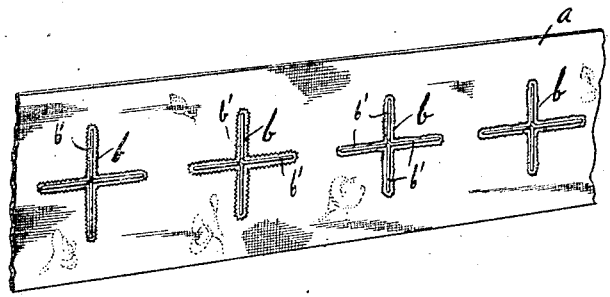
Fig. 1,
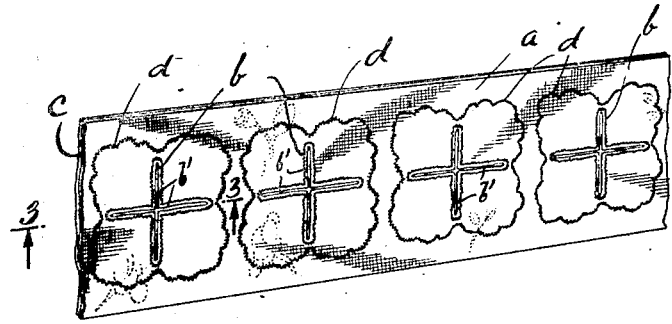
Fig. 2,
Fig. 3,
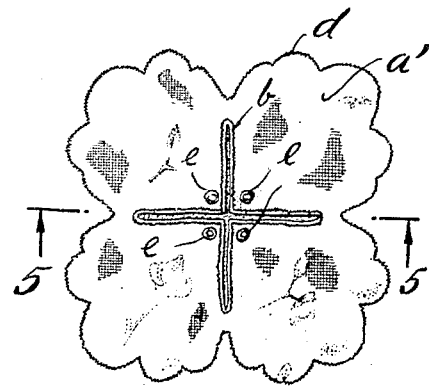
Fig. 4,
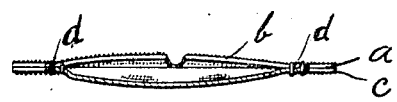
Fig. 5,
INVENTOR
Julius Steiner
BY
ATTORNEY Patented Feb. 16, 1926.

1,573,201

UNITED STATES PATENT OFFICE.

JULIUS STEINER, OF WEST NEW YORK, NEW JERSEY, ASSIGNOR OF ONE-HALF TO R. DALLA ROVERE, A PARTNERSHIP OF WOODCLIFF, NEW JERSEY, COMPOSED OF RICHARD DALLA ROVERE AND ALFRED PIETROBELLI.

METHOD OF PRODUCING BAGS OR THE LIKE.

Application filed November 7, 1925. Serial No. 67,617.

*To all whom it may concern:*

Be it known that I, JULIUS STEINER, a citizen of Switzerland, residing at West New York, in the county of Hudson and State of New Jersey, have invented certain new and useful Improvements in Methods of Producing Bags or the like, of which the following is a specification.

The present invention has for its object to provide a method whereby articles, such as ladies' hand-bags or the like, can be produced in great quantities at a time, thereby reducing the cost of manufacture thereof.

Another object of my invention is to provide a method of producing a hand-bag of a particular shape.

In carrying out my new method, I make use of a pattern controlled embroidering machine of the vertical type. I first stretch in the fabric frame a single layer of fabric and cause the machine to operate so as to form on said layer of fabric, at predetermined intervals and according to predetermined designs, a series of parallel borders, the parallel borders of each series being spaced apart to permit subsequent separation thereof by cutting. I then apply a second layer to the back of the first layer of fabric and cause the machine to embroider again at predetermined intervals and according to predetermined designs through the composite fabric, so that the stitches pass through both layers, the designs now produced being adapted to encircle the corresponding borders first embroidered on the upper or front layer of fabric. By these embroidered designs, which serve as marginal borders of the bags to be produced, the two layers become united at intervals. I then remove the composite fabric from the machine, divide said fabric into individual pieces by cutting through the intervals between adjacent embroidered marginal borders, trimming around the latter, and finally separate the parallel borders on the upper layer of fabric thereby forming the mouth openings for the bags.

The bags produced according to this method are in form of pouches, the back layer of fabric serving as bottom and the front or upper layer as top, with the mouth opening extending through the center of the top. For use, cords or the like may be attached either by stitching or through eyelets to the top of the bags to serve as handles.

The invention will be more fully understood by reference to the accompanying drawing in which Fig. 1 shows the upper layer with the parallel borders embroidered thereon; Fig. 2 shows in a perspective view the two layers united by the embroidered marginal borders; Fig. 3 is a section on line 3—3 of Fig. 2; Fig. 4 is a top plan view of a completed bag, and Fig. 5 is a section on line 5—5 of Fig. 4.

In the present example, the mouth of each bag is formed by two slits extending at right angles to one another and the designs produced first on the upper layer $a$ are, therefore, in form of crosses $b$, there being a free space $b'$ between adjacent parallel borders in each series to be subsequently slit or cut out to form the mouth. The designs $d$ embroidered on the composite fabric $a$, $c$, as will be seen from Fig. 2, encircle the designs $b$ and serve to form the marginal edges of the bags. To form handles, cords or the like may be attached to the four corners meeting in the center of the mouth, either by stitching or by attaching them to eyelets $e$ in the top $a'$ of the bag (Fig. 4).

It is, of course, understood that my new method may be used also for producing other articles than bags, such as pillow cases or tubular articles, and I, therefore, do not wish to restrict myself to hand-bags.

What I claim is:—

A method of producing a plurality of bags or the like at a time, consisting first in embroidering a series of designs at predetermined intervals and of predetermined patterns on a single layer of fabric, the embroideries in each series being parallel and spaced apart to permit subsequent separation from each other, then applying a second layer of fabric to the back of the first layer, then producing embroideries at predetermined intervals and of predetermined patterns on the composite fabric around the first embroideries by passing the stitches through both of the layers, these second embroideries being made to encircle said first embroideries and serving as marginal borders, then dividing the composite piece of fabric through the intervals between adjacent second embroideries and trimming around the latter and finally slitting the first layer of fabric between each two parallel borders to form openings.

In testimony whereof I affix my signature.

JULIUS STEINER.